United States Patent [19]
Uchida et al.

[11] Patent Number: 5,428,206
[45] Date of Patent: Jun. 27, 1995

[54] POSITIVE TEMPERATURE COEFFICIENT THERMISTOR HEAT GENERATOR

[75] Inventors: Katsuyuki Uchida; Asami Wakabayashi, both of Nagaokakyo, Japan

[73] Assignee: Murata Manufacturing Co., Ltd., Kyoto, Japan

[21] Appl. No.: 133,189
[22] PCT Filed: Mar. 29, 1993
[86] PCT No.: PCT/JP93/00386
§ 371 Date: Oct. 19, 1993
§ 102(e) Date: Oct. 19, 1993
[87] PCT Pub. No.: WO93/20670
PCT Pub. Date: Oct. 14, 1993

[30] Foreign Application Priority Data

Mar. 28, 1992 [JP] Japan .............................. 4-025975 U

[51] Int. Cl.$^6$ .............................................. H05B 1/02
[52] U.S. Cl. ............................ 219/505; 219/504; 219/483; 219/485; 219/511; 219/494
[58] Field of Search ............... 219/491, 494, 505, 504, 219/483, 486, 511, 512, 485

[56] References Cited

U.S. PATENT DOCUMENTS 3,651,308  3/1972  Kurokawa et al. ................. 219/505
4,316,080  2/1982  Wroblewski ........................ 219/505

FOREIGN PATENT DOCUMENTS 50-35996   4/1975  Japan .
50-150852  12/1975 Japan .
52-2913    1/1977  Japan .
53-158792  12/1978 Japan .
62-287586  12/1987 Japan .
63-160355  7/1988  Japan .

*Primary Examiner*—Mark H. Paschall
*Attorney, Agent, or Firm*—Ostrolenk, Faber, Gerb & Soffen

[57] ABSTRACT

A heat generator is formed to quickly raise the temperature of an object to be heated to a target level and then maintain the temperature of the object at the target level. The heat generator includes a high output heating element for heating the object to be heated, a temperature controller which is thermally coupled with the object and connected in series with the high output heating element for deenergizing the high output heating element when the temperature of the object exceeds the target level while energizing the high output heating element when the temperature of the object is reduced from the target level by a prescribed value, and a positive temperature coefficient thermistor which is thermally coupled with the object and connected in parallel with the high output heating element and the temperature controller, the thermistor having a Curie point set so as to produce an output capable of maintaining the object at the target temperature even when the high output heating element is deenergized.

20 Claims, 4 Drawing Sheets

POSITIVE TEMPERATURE COEFFICIENT THERMISTOR HEAT GENERATOR

FIELD OF THE INVENTION

The present invention relates to a heat generator including by a positive temperature coefficient thermistor, and more specifically, it relates to a positive temperature coefficient thermistor heat generator which is formed by combining a positive temperature coefficient thermistor for maintaining a temperature with a high output heating element for quickly raising the temperature of an object to be heated.

BACKGROUND ART

A positive temperature coefficient thermistor is a heat generator having a self temperature control function, which is used in various devices as a constant temperature heat generator requiring no temperature control circuit.

Further, such a positive temperature coefficient thermistor is also a safe heater having a function of preventing superheating, which is hardly influenced by the ambient temperature.

FIG. 4 shows an example of a positive temperature coefficient thermistor having the aforementioned characteristics, which is used in a heater. Employed herein is a positive temperature coefficient thermistor 10, which comprises a positive temperature coefficient thermistor element assembly 11 and electrodes 12 formed on both major surfaces thereof. One of the electrodes 12 is connected to an object 13 to be heated through an insulating sheet 16, so that the positive temperature coefficient thermistor 10 is fixed to the object 13.

When the temperature of the aforementioned object 13 is sufficiently low, i.e., when the temperature of the positive temperature coefficient thermistor 10 is sufficiently low, it is possible to supply high output to the positive temperature coefficient thermistor 10 due to a low resistance value of this positive temperature coefficient thermistor 10. In order to heat the object 13 to a desired target temperature (target temperature), therefore, it is possible to quickly raise the temperature of the object 13 by supplying high output up to an intermediate stage of heating, e.g., to about 50% of a temperature-rise width for the target temperature, as shown in FIG. 5. However, beyond the stage of about 50% of the temperature-rise width, for example, the temperature of the positive temperature coefficient thermistor 10 rises at a higher speed than that of the object 13 to reach a level in a stable temperature region (temperature control region), and hence a amount of the supplied power is extremely reduced. As a result, the speed for raising the temperature of the object 13 is so disadvantageously reduced that a long time is required for raising the temperature of the object 13 to the target level.

On the other hand, there is used a heat generator having such a structure that a bimetal member 14 serving as temperature control means is thermally coupled to an object 13 to be heated and a high output heating element 15 of a foil heater or the like, for example, is connected in series to the bimetal member 14, as shown in FIG. 6. In this heat generator, it is possible to supply the high output heating element 15 with power which is greater than that required for maintaining the object 13 at a target temperature, due to a low resistance value of the high output heating element 15. Therefore, the temperature of the object 13 is raised at a high speed, while dispersion, i.e., pulsation disadvantageously appears in the temperature of the object as shown in FIG. 7, since the bimetal member 14 repeats ON and OFF states to carry out temperature control.

In addition to this, the heat generator shown in FIG. 6 has a mechanical contact due to the employment of the bimetal member 14, while switching between the ON and OFF states is repeatedly carried out. Therefore, noises are caused by such repetition of the ON and OFF states, while a malfunction is easily caused by deterioration of the contact.

BRIEF DESCRIPTION

An object of the present invention is to provide a heat generator which can solve the aforementioned problems and quickly heat an object to be heated to a target temperature while being capable of stably maintaining the temperature of the object at the target level and employing a positive temperature coefficient thermistor which hardly causes noises and has excellent durability.

The positive temperature coefficient thermistor heat generator according to one embodiment of the present invention comprises a high output heating element for heating an object to be heated, temperature control means which is thermally coupled with the object and connected in series with the high output heating element for stopping energization to the high output heating element when the temperature of the object exceeds a target level while energizing the high output heating element when the temperature of the object is reduced from the target level by a prescribed value, and a positive temperature coefficient thermistor which is thermally coupled with the object and connected in parallel with the high output heating element and the temperature control means with its Curie point being set so as to extract an output capable of maintaining the object at the target temperature even when the high output heating element is not energized.

Before the object reaches the target temperature, the temperature control means (means for ON-OFF controlling energization to the high output heating element under prescribed temperature condition) is maintained in an ON state to energize both of the positive temperature coefficient thermistor and the high output heating element, whereby the temperature of the object is quickly raised. When the temperature of the object approaches the target level, the positive temperature coefficient thermistor enters a temperature control region and the amount of power consumption is damped, while the high output heating element continues consumption of high output to quickly raise the temperature of the object to the target level.

When the temperature of the object exceeds the target level, the temperature control means which is thermally coupled with the object enters an OFF state to stop energization to the high output heating element. On the other hand, the Curie point of the positive temperature coefficient thermistor which is connected in parallel with the high output heating element and the temperature control means is set to be capable of extracting an output which can maintain the temperature of the object at the target level even if the former so approaches the latter that the positive temperature coefficient thermistor enters a temperature control region and the amount of power consumption is damped. Therefore, the positive temperature coefficient thermistor prevents the object from undergoing reduction in temperature, thereby accurately maintaining the undergoing object at the target temperature.

According to the inventive positive temperature coefficient thermistor heat generator, therefore, it is possible to quickly raise the temperature of an object to be heated to a target level, while it is also possible to stably maintain the temperature of the object at the target level. Further, the temperature control means will not enter an ON state unless the temperature of the object is reduced from the target level by a prescribed value to cause no ON-OFF operation in a stationary state, whereby it is possible to prevent generation of noises as well as deterioration of a contact, for improving durability of the heat generator.

According to a specific aspect of the present invention, the aforementioned high output heating element is formed by a second positive temperature coefficient thermistor, whose Curie point is set at a higher level than that of the positive temperature coefficient thermistor, which is connected in parallel with the high output heating element and the temperature control means, to be capable of extracting an output which is higher than that required for maintaining the object at a target temperature.

When the high output heating element is formed by a high output second positive temperature coefficient thermistor as described above, it is possible to reliably prevent superheating by a self temperature control function of the second positive temperature coefficient thermistor even if the aforementioned temperature control means does not normally operate after the object reaches the target temperature.

BEST MODES FOR CARRYING OUT THE INVENTION

Embodiments of the present invention are now described with reference to the drawings, to clarify the present invention.

Figure 1:
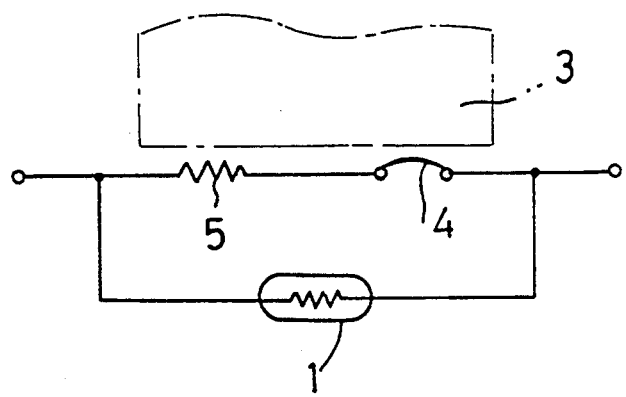
FIG. 1 is a diagram showing the circuit structure of a positive temperature coefficient thermistor heat generator according to an embodiment of the present invention.

FIG. 1 is a diagram showing the circuit structure of a positive temperature coefficient thermistor heat generator according to an embodiment of the present invention.

The positive temperature coefficient thermistor heat generator according to this embodiment has a structure obtained by connecting a bimetal member 4 serving as temperature control means and a foil heater 5 serving as a high output heating element in series with each other, as shown in FIG. 1. The aforementioned bimetal member 4, which is thermally coupled with an object 5 to be heated, is formed to be supplied with heat from the object 5. Further, a positive temperature coefficient thermistor 1 is connected in parallel with the aforementioned bimetal member 4 and the foil heater 5.

The aforementioned positive temperature coefficient thermistor 1, which is thermally coupled with the aforementioned object 5, is made of a well-known positive temperature coefficient thermistor material prepared by adding a rare earth element to barium titanate as an agent for bringing the same into a semiconductor state, for example. The Curie point of the positive temperature coefficient thermistor 1 is set to be capable of maintaining the object 5 at a prescribed temperature (target temperature) even when energization to the foil heater 5 is stopped and only the positive temperature coefficient thermistor 1 is energized. This Curie point is so properly selected in response to heat conductivity to the object that the same is higher than the target temperature when the heat conductivity is inferior while the same is lower than the target temperature when the heat conductivity positive characteristic is excellent.

Further, the aforementioned bimetal member 4 is deformed to enter an OFF state when the temperature of the object 3 exceeds the target level. When the temperature is reduced by a prescribed value from the target level, on the other hand, the aforementioned bimetal member 4 returns to a prescribed shape to enter an ON state. The aforementioned prescribed temperature is set at a level which is lower than the lower limit of a temperature region which can be maintained by the positive temperature coefficient thermistor.

Figure 2:
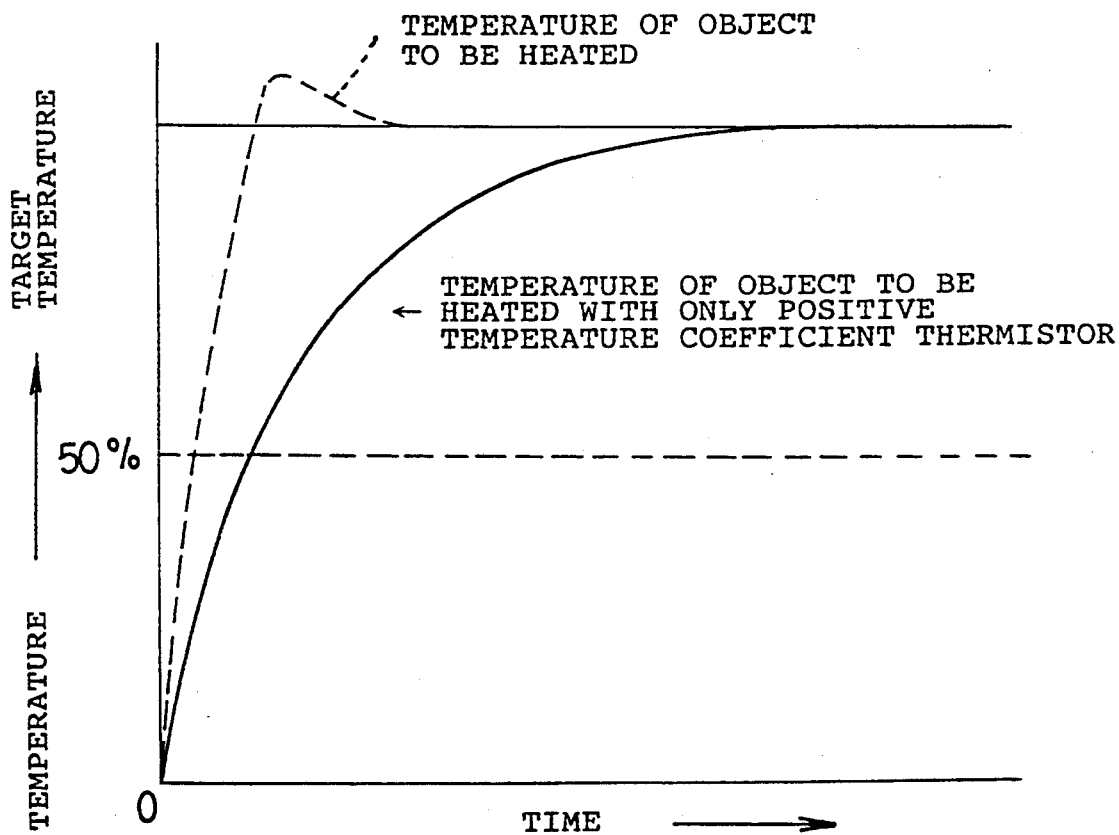
FIG. 2 is a diagram for illustrating an operation of the positive temperature coefficient thermistor heat generator according to the preferred embodiment of the present invention.

An operation of the positive temperature coefficient thermistor heat generator according to this embodiment having the aforementioned structure is now described with reference to FIG. 2. When this positive temperature coefficient thermistor heat generator is energized, a current flows to both of the foil heater 5 and the positive temperature coefficient thermistor 1 in an initial stage, and high output is consumed so that the temperature of the object 3 is quickly increased.

When such energization is further continued, the positive temperature coefficient thermistor 1 reaches a temperature level in a temperature control region, whereby the power consumed by the positive temperature coefficient thermistor 1 same is damped. However, the foil heater 5 continuously consumes high output, to quickly raise the temperature of the object 3 to the target level.

When the temperature of the object 3 exceeds the target level, the bimetal member 4 which is thermally coupled with the object 3 is deformed to enter an OFF state. Consequently, the energization to the foil heater 5 is stopped.

In the positive temperature coefficient thermistor 1 which is connected in parallel with the foil heater 5 and the bimetal member 4, on the other hand, the resistance value is increased and the amount of power consumption is reduced when the temperature of the object 3 approaches the target level. However, its Curie point is set so as to be capable of extracting an output which can maintain the temperature of the object 3 at the target level, whereby the positive temperature coefficient thermistor prevents the temperature of the object 3 from reduction below the target temperature, thereby reliably maintaining the object 3 at the target temperature.

Therefore, it is possible to quickly raise the temperature of the object 3 to the target level, while it is also possible to stably maintain the temperature of the object 3 at the target level. Further, the bimetal member 4 will not enter an ON state unless the temperature of the object 3 is reduced from the target level by a prescribed value. Therefore, the bimetal member will not operate to repeat ON and OFF states in a stationary state, whereby it is possible to prevent generation of noises as well as deterioration of a contact, for improving durability of the bimetal member.

Figure 3:
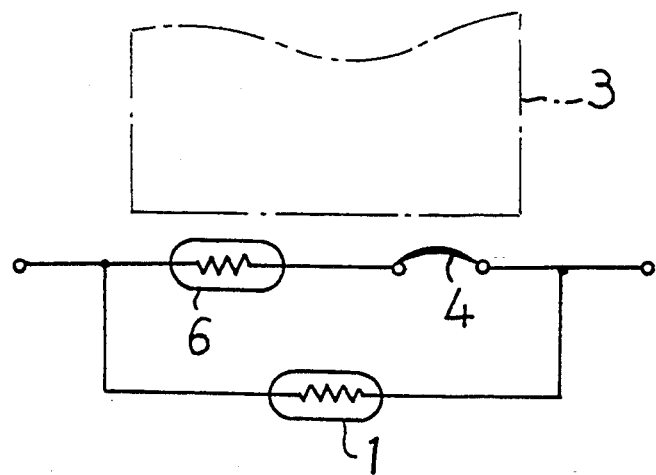
FIG. 3 is a diagram showing the circuit structure of a positive temperature coefficient thermistor heat generator according to another embodiment of the present invention.
Figure 4:
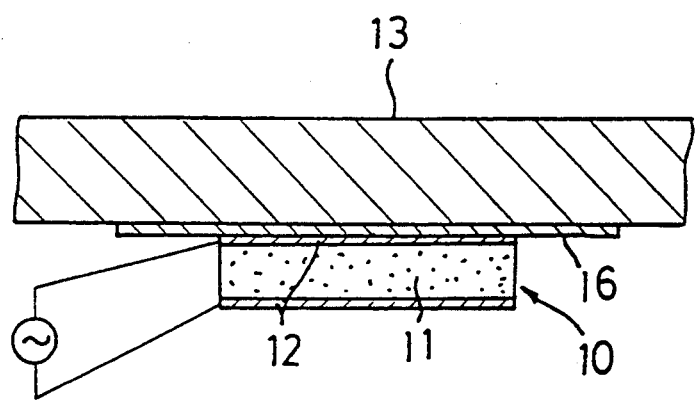
FIG. 4 is a partially fragmented sectional view showing a conventional positive temperature coefficient thermistor heat generator.
Figure 5:
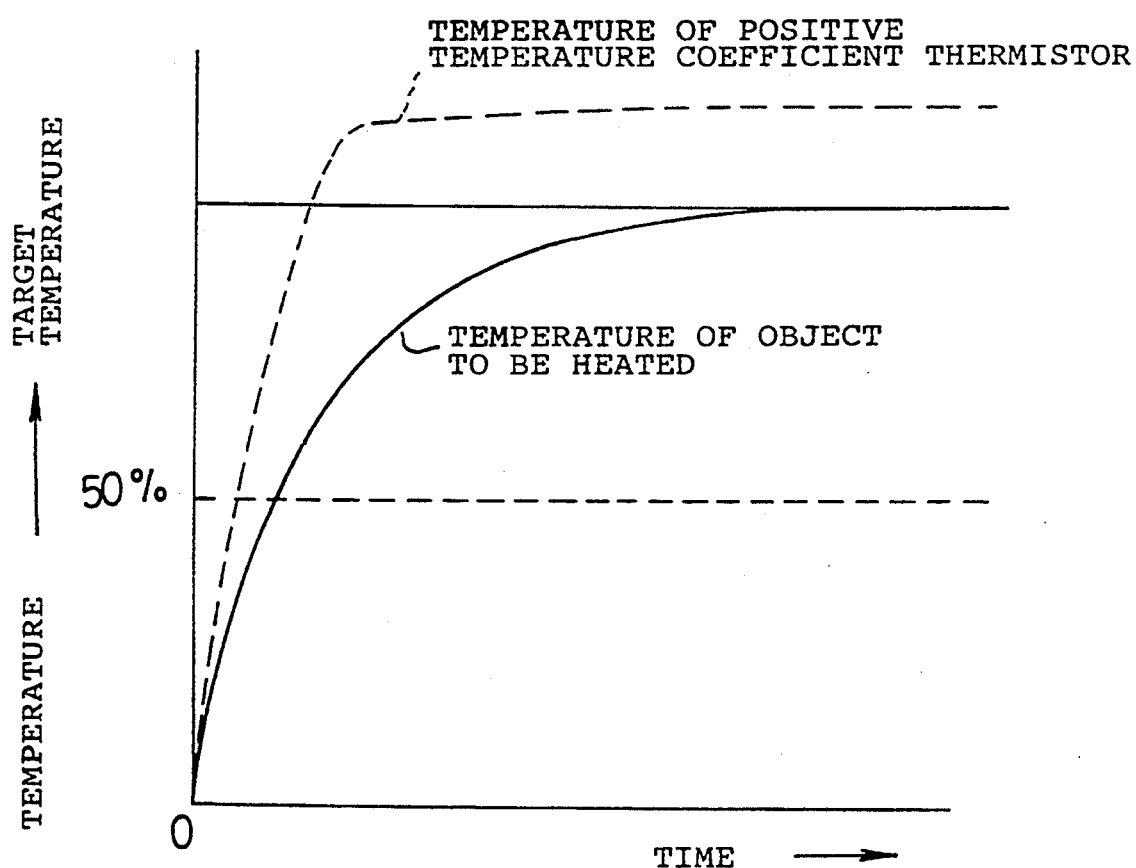
FIG. 5 is a diagram for illustrating an operation of the conventional positive temperature coefficient thermistor heat generator.
Figure 6:
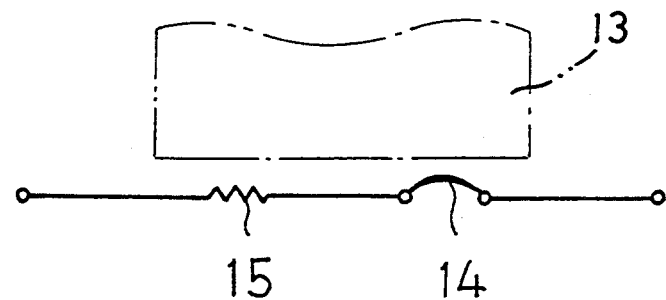
FIG. 6 is a circuit diagram showing another example of a conventional positive temperature coefficient thermistor heat generator.
Figure 7:
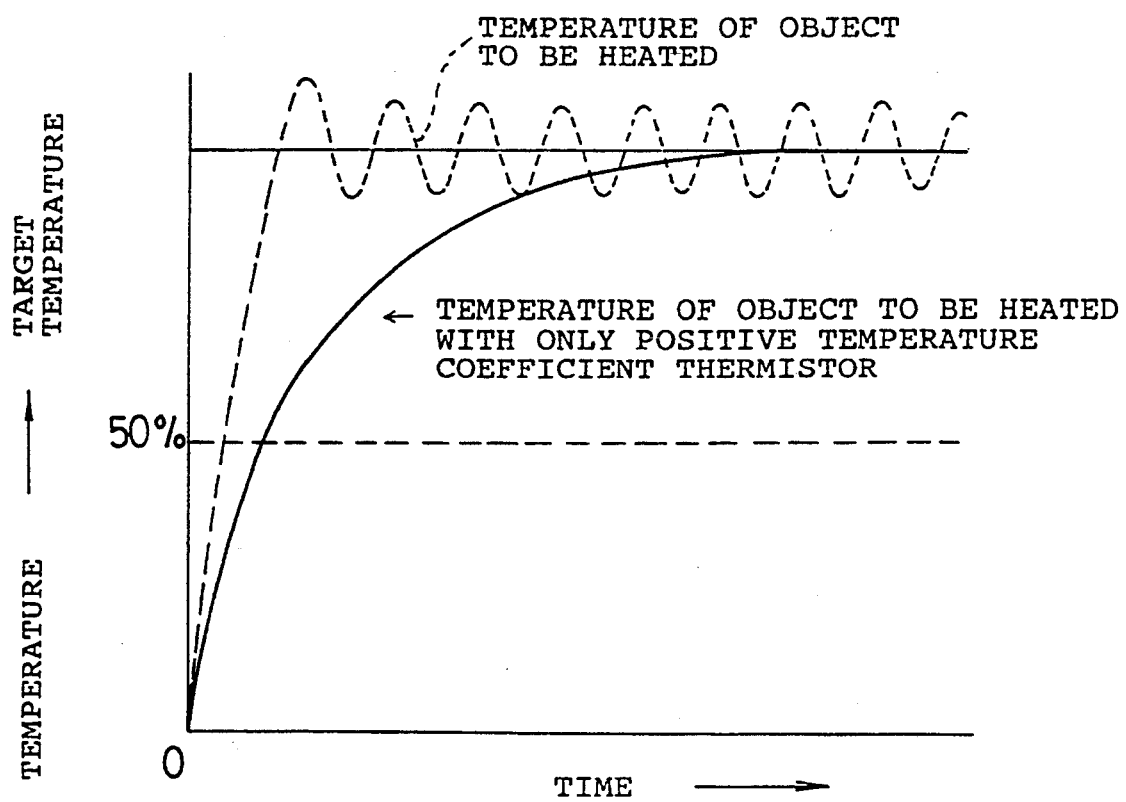
FIG. 7 is a diagram for illustrating an operation of the other example of the conventional positive temperature coefficient thermistor heat generator.

FIG. 3 is a circuit diagram for illustrating a positive temperature coefficient thermistor heat generator according to a second embodiment of the present invention. In the second embodiment, a high output heating element is formed by a second positive temperature coefficient thermistor 6. In other points, the second embodiment is structured similarly to the first embodiment, and hence corresponding portions are denoted by corresponding reference numerals, to omit redundant description.

In the second positive temperature coefficient thermistor 6, its Curie point is set at a relatively high level, to be capable of extracting an output which is higher than that required for maintaining an object 3 to be heated at a target temperature. Namely, the Curie point of the second positive temperature coefficient thermistor 6 is set to be higher than that of a positive temperature coefficient thermistor 1.

Due to the aforementioned structure of forming the high output heating element by the second positive temperature coefficient thermistor 6, it is possible to reliably prevent superheating by a self temperature control function of the positive temperature coefficient thermistor 6 upon occurrence of such abnormality that the bimetal member 4 does not normally operate, i.e., does not enter an OFF state even if the object 3 reaches the target temperature. In other words, resistance of the second positive temperature coefficient thermistor 6 is so abruptly increased that the amount of power supply to the second positive temperature coefficient thermistor 6 itself is abruptly reduced, whereby superheating can be reliably prevented. When importance is attached to safety, therefore, the aforementioned high output second positive temperature coefficient thermistor 6 is preferably employed as the high output heating element as in the second embodiment.

Although each of the aforementioned embodiments has been described with reference to the bimetal member 4 employed as temperature control means, the temperature control means is not restricted to the aforementioned bimetal member 4 but may be prepared from any arbitrary material so far as the same is a switching element which can receive heat from the object to take ON and OFF states by the temperature, and can be formed by a material having a shape memory alloy storing a prescribed shape and a contacted portion combined with the said shape memory alloy, a relay or the like, for example.

Although the first embodiment has been described with reference to the foil heater 5, being a constant output heater, which is employed as a high output heating element, the high output heating element 5 can alternatively be formed by various heaters, other than the foil heater, which generate heat upon energization.

While the Curie point of the second positive temperature coefficient thermistor 6 is set to be higher than that of the first positive temperature coefficient thermistor 1 in the second embodiment, Pb or the like may be added to a barium titanate semiconductor material, for example, in order to set the Curie point at such a high level, and this can be easily performed by a well known method.

We claim:

1. A positive temperature coefficient thermistor heat generator comprising:
    a high output heating element for heating an object to be heated;
    temperature control means being thermally coupled with said object and connected in series with said high output heating element for deenergizing said high output heating element when the temperature of said object exceeds a target temperature while energizing said high output heating element when the temperature of said object is reduced from said target temperature by a prescribed value; and
    a positive temperature coefficient thermistor being connected in parallel with said high output heating element and said temperature control means and thermally coupled with said object, a Curie point of said positive temperature coefficient thermistor being set so as to extract an output for maintaining said object at said target temperature even when said high output heating element is not energized.

2. A positive temperature coefficient thermistor heat generator in accordance with claim 1, wherein said high output heating element is a second positive temperature coefficient thermistor, a Curie point of which is so set as to extract an output being higher than that required for maintaining said object at said target temperature.

3. A positive temperature coefficient thermistor heat generator in accordance with claim 2, wherein said Curie point of said second positive temperature coefficient thermistor is set to be higher than that of said positive temperature coefficient thermistor being connected in parallel with said second thermistor and said temperature control means.

4. A positive temperature coefficient thermistor heat generator in accordance with claim 1, wherein said temperature control means is a bimetal member being deformed to deenergize to said high output heating element when the temperature of said object exceeds said target level while returning to a prescribed shape to energize said high output heating element when the temperature of said object is reduced from said target level by said prescribed value.

5. A positive temperature coefficient thermistor heat generator in accordance with claim 1, wherein said high output heating element is a heat generating resistor generating heat by energization.

6. A positive temperature coefficient thermistor heat generator in accordance with claim 5, wherein said heat generating resistor is a foil heater.

7. A heat generator comprising:
    a high output heating element for heating an object;
    a temperature controller thermally coupled with the object and connected to the high output heating element to deenergize the high output heating element when the object reaches a target temperature; and a positive thermal coefficient thermistor being connected to the high output heating element and the temperature controller and thermally coupled with the object so that the high output heating element and the positive thermal coefficient thermistor jointly heat the object, the positive thermal coefficient thermistor being formed so as to reduce an amount of power consumed by the positive thermal coefficient thermistor when a temperature of the positive thermal coefficient thermistor is within a temperature control region and to maintain the object at the target temperature even when the high output heating element has been deenergized by the temperature controller in response to the object reaching the target temperature.

8. The heat generator of claim 7, wherein the temperature controller is adapted to energize the high output heating element when the temperature of the object falls below the target temperature by a predetermined amount.

9. The heat generator of claim 7, wherein the positive thermal coefficient thermistor is connected in parallel with the high output heating element.

10. The heat generator of claim 7, wherein the temperature controller is connected in series with the high output heating element.

11. The heat generator of claim 7, wherein the positive thermal coefficient thermistor has a Curie point that is set so that heat output from the positive thermal coefficient thermistor maintains the object at the target temperature even when the high output heating element has been deenergized by the temperature controller.

12. The heat generator of claim 7, wherein the temperature controller comprises a bimetal member being deformable to deenergize the high output heating element when the temperature of the object reaches the target temperature and resilient to return to a desired shape to energize the high output heating element when the temperature of the object falls below the target temperature by a predetermined amount.

13. The heat generator of claim 7, wherein the positive thermal coefficient thermistor and the high output heating element cooperate to jointly heat the object when a temperature of the object is below the target temperature.

14. The heat generator of claim 7, wherein the high output heating element comprises a second positive temperature coefficient thermistor having a Curie point that is set to produce an output that is higher than that required for maintaining the object at the target temperature.

15. The heat generator of claim 14, wherein the Curie point of the second positive coefficient thermistor is set to be higher than that of the positive coefficient thermistor connected to the second thermistor and the temperature controller.

16. The heat generator of claim 11, wherein the high output heating element comprises a heating generating resistor.

17. The heat generator of claim 16, wherein the heat generating resistor is a foil heater.

18. A method of heating an object, the method comprising the steps of:
supplying power to a high output heating element and a positive thermal coefficient thermistor each thermally coupled to the object so that the high output heating element and the positive thermal coefficient thermistor jointly heat the object;
damping power consumption of the positive thermal coefficient thermistor when a temperature of the positive thermal coefficient thermistor is within a temperature control region;
stopping a supply of power to the high output heating element when a temperature of the object reaches a target temperature;
maintaining the object at the target temperature by continuing the supply of power to the positive thermal coefficient thermistor.

19. The method of claim 18, further comprising the step of re-establishing the supply of power to the high output heating element in response to the temperature of the object falling below the target temperature by a predetermined amount.

20. The method of claim 18, wherein the high output heating element comprises a second positive thermal coefficient thermistor which has a Curie point set to be higher than that of the positive coefficient thermistor.

* * * * *